United States Patent [19]

Seelbach

[11] 3,747,513
[45] July 24, 1973

[54] APPARATUS FOR PROCESSING FOODSTUFFS
[75] Inventor: Bernard H. Seelbach, Staatsburg, N.Y.
[73] Assignee: K. C. Seelback Co., Inc., Rhinebeck, N.Y.
[22] Filed: Mar. 3, 1972
[21] Appl. No.: 231,566

[52] U.S. Cl. ................................... 99/476, 99/480
[51] Int. Cl. .............................................. A23b 3/04
[58] Field of Search...................... 99/473, 474, 480, 99/481, 476, 477, 478, 479, 480, 481, 516, 229

[56] References Cited
UNITED STATES PATENTS
| | | | |
|---|---|---|---|
| 1,333,552 | 3/1920 | Legg | 99/480 |
| 2,761,374 | 9/1956 | Sandler | 99/475 |
| 2,832,278 | 4/1958 | Taranik | 99/475 |
| 2,625,095 | 1/1953 | Julian | 99/480 |

Primary Examiner—Robert W. Jenkins
Attorney—Thomas M. Marshall

[57] ABSTRACT

The present invention describes a method and apparatus for processing foodstuffs. The apparatus comprises a housing that is divided into three chambers, one above the other. The lower chamber is the processing chamber, the upper chamber is the air and/or smoke distribution chamber, and the intermediate chamber is a plenum chamber. Suitable openings interconnect the several chambers, and an air inlet extends from a point externally of the housing to the intermediate plenum chamber. An air outlet and heating means are disposed in the distribution chamber, while means for supplying smoke extend from a point externally of the housing to the processing chamber. A blower is mounted in the distribution chamber and is driven in such manner as to withdraw air and/or smoke from the processing chamber and air from the plenum chamber to the distribution chamber for eventual recycling to the processing chamber, or to the air outlet. The opening interconnecting the plenum chamber and the processing chamber is provided with a variable slot arrangement including an inverted volute and a hollow truncated cone, with the combination of said volute and truncated cone being effective to ensure a uniform distribution of air and/or smoke within the processing chamber. The uniform distribution of flow within the processing chamber is required to ensure the uniform cooking and/or smoking of all of the foodstuff products disposed in the processing chamber.

35 Claims, 8 Drawing Figures

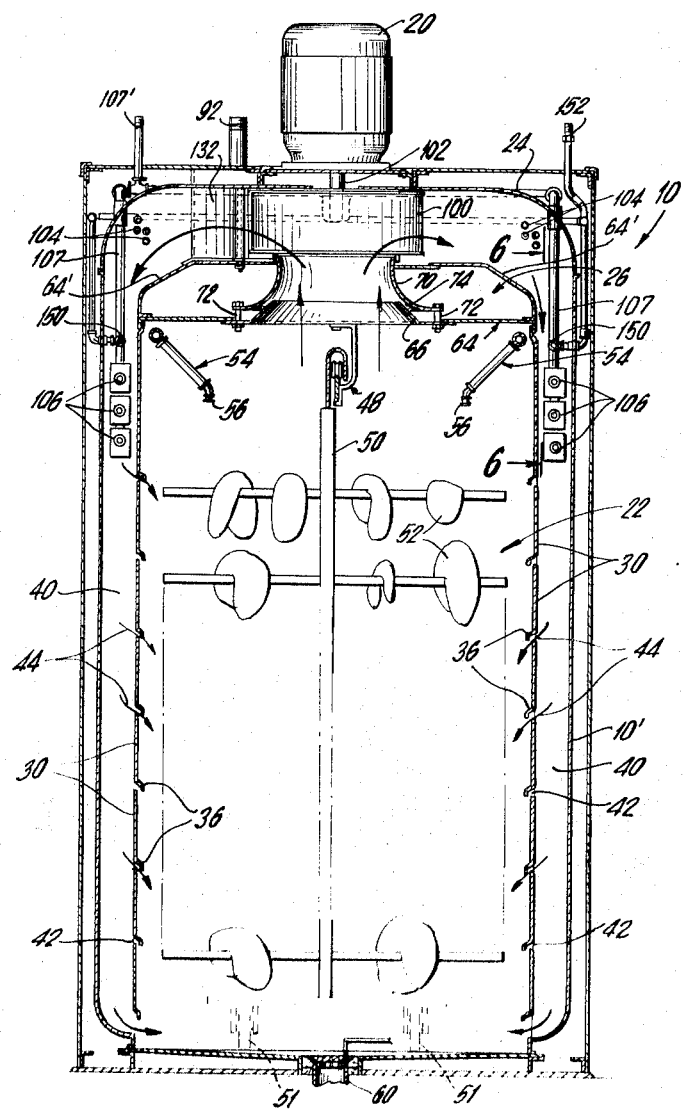

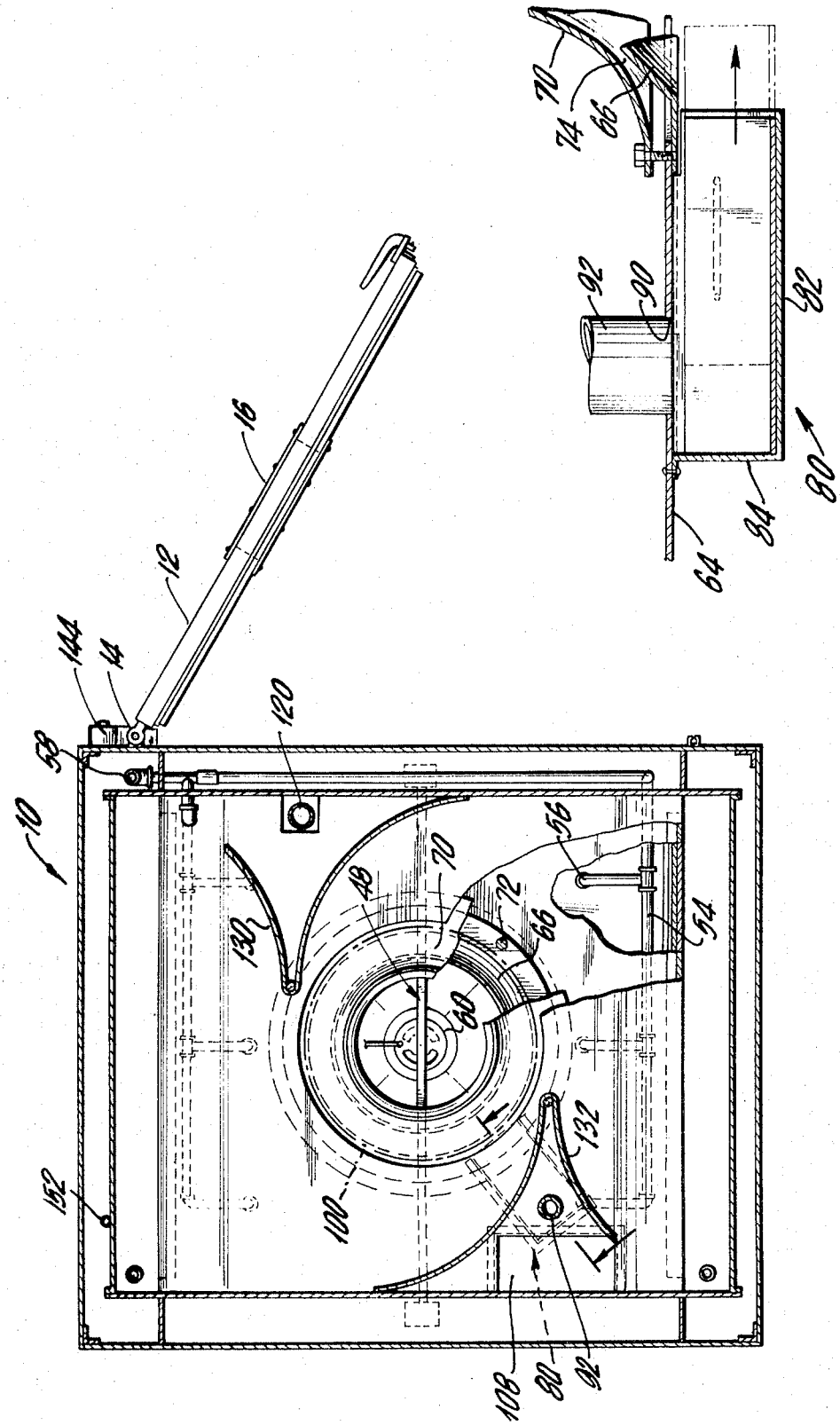

APPARATUS FOR PROCESSING FOODSTUFFS

FIELD OF THE INVENTION

The present invention relates to an apparatus for processing foodstuffs, such as meat, sausage, fish, ham, cheese and the like, in a rapid and efficient manner.

Shaped meat products, such as skinless frankfurters and sausage, comprise a prepared emulsion with meat, curing agents, and spices which are stuffed into artificial casings such as cellulosic casings. The resulting product forms a container, permeable to moisture and curing smoke, and of a predetermined size for cooking to a desired uniform weight. Cooking and/or smoking of the encased meat emulsion operates to coagulate the meat proteins of the emulsion and thereby create a solid with a smooth surface formation. As dictated by various Government regulations, the smoking and cooking process must meet certain requirements. For example, the Meat Inspection Division of the U. S. Department of Agriculture has set requirements that the internal temperature of a frankfurter must attain at least a minimum temperature of 137° F. In meeting this standard, it has been the common practice of the meat processing industry to maintain a minimum temperature of 137° F. for at least 5 minutes. The American Meat Institute Foundation recommends cooking sausage to an internal temperature of 150° F., in order to prevent bacterial spoilage in the meat, and it has been found as common practice in the industry that 155° F. is effective in most cases in preventing a condition commonly referred to as bacterial "greening." Based on these requirements, it has been the general practice of the industry, in an attempt to ensure that the internal temperature of the meat emulsion reaches the prescribed temperature for the desired length of time, to require the cooking and/or smoking operations to extend over a period of time from 1 to 8 hours per batch, depending upon the type of emulsion, casing, and the type of conventional processing house employed in the process. It should be noted that one of the primary objectives of processing foodstuffs is to ensure that all bacterial growth has been destroyed or substantially inhibited, which bacterial growth could result in spoilage of the meat. It is also important to attain the desired color of the meat and the desired surface formation, as well as the desired texture.

DESCRIPTION OF THE PRIOR ART

The common processing chamber, also referred to as a smokehouse, known in the art includes a large smoking chamber into which strands of the comminuted meat emulsion product are placed over a "tree" consisting of a rack which is either rolled into the chamber or guided on a central rail mounted in the smoke house compartment. An opening is provided in the top of the smoking chamber, with a large fan mounted above the opening. Ducting extends from the region of the fan to an inlet to the smoking chamber. During the various cycles of operation of the conventional smoke house, air or smoke is introduced into the chamber and the fan is slowly rotated to circulate the flow from the chamber, through the ducting and back to the smoking chamber. The low velocity recirculated flow is continued until all of the foodstuffs are completely dried and cooked. This type of conventional smokehouse requires long processing periods in order to ensure that all of the foodstuffs within the smoking compartment are properly treated. In general, this type of smoke house is extremely inefficient, requiring long processing times which increase the cost of processing foodstuffs.

A modified form of conventional smokehouse has been proposed, including a housing having a lower smoking chamber and an upper distribution chamber. Mounted above the smoking chamber in the distribution chamber is a blower arrangement which is positioned immediately above a central opening in the partition separating the smoking chamber and the distribution chamber. The blower withdraws air or smoke from the smoking chamber and circulates the air/smoke around the outside of the smoking chamber in order to enable it to be distributed along the side walls of the smoking chamber. Because of the suction effect of the overhead blower pulling a central column of air straight up through the smoking chamber, dead spots in the air flow are created on the upper left and right walls of the smoking chamber. Accordingly, the rate of temperature rise in the products located along the upper right and upper left walls of the smoking chamber is generally very slow, as contrasted to the products in other portions of the smoking chamber. Hence, products in these "dead spots" have slower color development, and as a result there is non-uniformity in the resulting color of the products disposed in the smoking chamber. In order to alleviate this problem, attempts have been made to decrease the cooking time in these conventional smokehouses by using a moderate velocity gaseous movement (as contrasted to low velocity gaseous movement extending over a relatively long period of time), with the moderate velocity gaseous movement being on the order of recycling all of the air/smoke within the smoking chamber from 4 to 8 times per minute. This approach has been generally unsuccessful because the air movement is not effectively and uniformly directed to the surface of the entire product in the smokehouse. Accordingly, as a consequence, to obtain best results by using moderate velocity gaseous movement, the processing time had to be increased by several hours in order to process the product satisfactorily. As is readily apparent, the longer it takes to process the product, the greater the cost of processing because of labor costs and, in addition, the increased time in exposing the food products to the high temperature conditions within the smokehouse gives rise to greater product shrinkage. Accordingly, the combination of the labor costs and the greater shrinkage results in the inefficient operation of prior art smokehouses.

SUMMARY OF THE INVENTION

It is therefore an object of the present invention to provide an improved method and apparatus for processing foodstuffs, and in particular, a method and apparatus for processing foodstuffs which provides a uniform cooking and smoking of the products disposed in the processing chamber.

It is another object of this invention to decrease to a fraction the time required for processing foodstuffs.

It is still a further object of the invention to rapidly process comminuted meat emulsions having acceptable color, texture and bacterial factors.

In accordance with the present invention, there is provided an apparatus including a housing having an intermediate false ceiling which divides the housing into an upper distribution chamber and a lower processing chamber. The false ceiling includes a plenum chamber connected by means of suitable ducting to an air inlet in the wall of the housing, and the false ceiling further includes openings providing communication between the processing chamber, the distribution chamber and the plenum chamber. Ducting extends from the distribution chamber to the processing chamber, and an outlet is provided in the distribution chamber, as well as heating means. The apparatus includes means for providing smoke to a smoke chute located in the processing chamber in the region of the opening between the processing chamber and the plenum chamber. In addition, a two-speed blower is disposed in the distribution chamber above the openings connecting the various chambers, and the blower is driven by suitable means for circulation of air and/or smoke within the housing. A hollow truncated cone is provided in the opening between the plenum chamber and the smoking chamber, and a volute is provided in the plenum chamber, with the volute and truncated cone cooperating to define a restricted passageway to control the flow of intake air from the plenum chamber to the distribution chamber. The arrangement of the volute and hollow cone ensures that the flow within the processing chamber is uniformly distributed throughout the entire processing chamber, thereby insuring that all of the meat products within the processing chamber are uniformly cooked and/or smoked. If desired, a water spray assembly may be provided in the processing chamber. In the process of the subject invention, after the meat products have been placed on a "tree" within the processing chamber, the blower is operated at high velocity and the air in the housing is pre-heated. Next, the air intake and exhaust are opened such that outside air passes through the air inlet to the plenum chamber, past the restricted opening defined by the volute and truncated cone, and is mixed with the air withdrawn from the processing chamber by the blower to the distribution chamber. The circulating air is further heated by the heating means, and a portion thereof is allowed to exhaust through the exhaust outlet. As the air is withdrawn from the processing chamber, and a portion of the heated air is circulated through the ducting to the processing chamber, the moisture within the processing chamber is removed and hence the meat products are dried. During the drying cycle, while humidity is being removed from the foodstuffs by recirculation of the air, the foodstuffs are being heated to the temperature at which the products reach the desired color. The next phase of operation is the smoke cycle. At such time, the dampers for the air inlet and air exhaust are closed, and smoke is introduced through the smoke inlet to a smoke chute provided in the processing chamber, and after leaving the smoke chute, the smoke is withdrawn upwardly past the truncated cone and volute to the distribution chamber where it passes the heating coils and is circulated through the ducting extending along the sides of the processing chamber. The smoke cycle of the subject process continues for a pre-set time cycle and during this period of time, the heating means are constantly heating the recirculating smoke, thereby causing a simultaneous smoking and cooking of the meat products. After the designated time cycle, the smoke supply is cut off, and the smoke within the housing is removed by rinsing it with steam that is collected in a drain located in the base of the processing chamber. As previously mentioned, the law requires that a minimum temperature be reached in order to ensure that bacteria such as trichina have been destroyed. Hence, if at the completion of the smoke cycle, the foodstuffs have not reached the required temperature, circulation of the heated air is contined. At such time, if required, additional moisture is added to the air to aid in the cooking process. The final cycle of the subject process is the showering of the meat products. This cycle is optional depending on the processor's needs. The shower cycle provices the wetting down with water or liquid coolant of the meat products by the shower means provided in the processing chamber. The operation of the subject apparatus and the practice of the subject process may be automatically controlled by appropriate electrical means, with at least one temperature probe being provided into a sample meat product in order to determine the internal temperature of the meat, and at least one temperature device being provided in the processing chamber for providing control signals to the electrical means.

The apparatus of the subject invention is so constructed as to enable the rapid and consistent cooking and smoking of meat products, so as to produce color development and surface formation which is particularly desirable to the consumer; to impart specific texture to the meat products; and to achieve destruction of the bacterial growth which causes spoilage of the meat. The specific construction of the subject apparatus ensures the uniform distribution of the air and/or smoke during all phases of operation of the subject apparatus, thereby greatly minimizing the amount of time needed for processing foodstuffs, and as a result, enables greater control of the amount of shrinkage of the foodstuffs. The combination of control of shrinkage and faster processing time greatly reduces the cost of cooking and/or smoking foods, and in addition, results in a superior product.

BRIEF DESCRIPTION OF THE DRAWINGS

For a better understanding of the invention and to show how it may be carried into effect, reference will now be made to a preferred embodiment of the subject apparatus, described and illustrated with reference to the accompanying drawings in which:

FIG. 5 is a sectional view taken along line 5—5 in FIG. 3;

FIG. 7 is a partial sectional view taken along line 7—7 in FIG. 5; and

Turning to FIG. 1, the apparatus of the subject invention generally comprises an enclosure or housing 10 which is insulated and is of generally rectangular cross-section, and of considerably greater vertical height than cross-section. The housing 10 is provided with a door 12 hinged as at 14. A glass portal 16 is provided in the door, as well as a lamp 18 in order to enable the operator to view the internal processing chamber of the housing. A two-speed motor 20 is mounted on the top of the housing 10, and the various piping, to be described in detail hereinafter, is provided through the upper portion of the housing 10.

Referring to FIGS. 3 and 4 which illustrate cross-sections of the housing, the internal portion of the housing is generally divided into three compartments, one above the other. The lowermost and largest compartment is the processing chamber 22, while the uppermost chamber is the distribution chamber 24, with the intermediate chamber being a plenum chamber 26.

Figure 1:
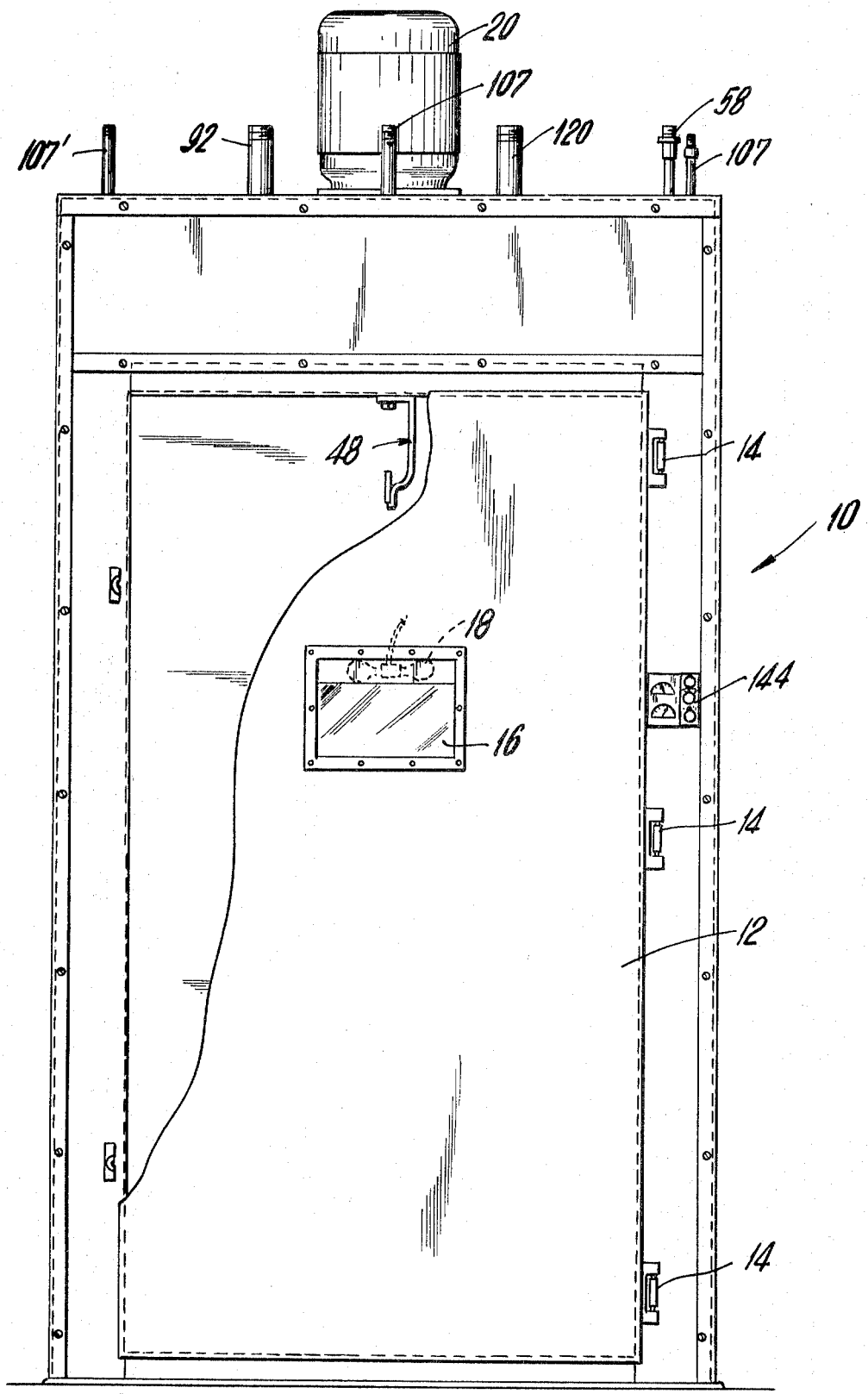
FIG. 1 is a front elevational view, partially in section, of the apparatus of the subject invention.

Disposed along opposite walls of the processing chamber 22 are a series of spaced vertical slats 30 which are preferably made of a non-corrosive material such as stainless steel, and each of which is adjustably mounted by means of pins 32 that are slideably mounted within vertical slots 34 (see FIG. 3) provided in the slat. As noted in FIG. 4, each adjustable slat 30 includes a downwardly directed flange 36, and the slats 30 are spaced from the interior wall 10' of the housing 10 to define two side ducts 40. As more fully described hereinafter, air and/or smoke provided from the distribution chamber 24 to the side ducts 40 is allowed to vent through elongated passageways 42 defined between adjacent slats 30. Air flow, indicated by arrow 44, passing the adjustable passageway 42 impinges on the flanges 36 and is disturbed thereby resulting in turbulant flow which is very effective in ensuring uniform flow around all of the foodstuffs. As noted in FIG. 4, the lowermost passageway 42 in each side duct 40 of the smoking chamber may be of greater size than the other passageways 42 whereby a substantial portion of the air and/or smoke provided from the distribution chamber may exit through these lowermost passageways. Realizing that this air and/or smoke is generally of a higher temperature than the air within the processing chamber, it is readily appreciated that the "dumping" of a large percentage of the total air and/or smoke at the bottom of the processing chamber under the product, also helps to achieve a more uniform heat and circulation flow throughout the entire processing chamber 22.

Mounted within the processing chamber 22 is a rail assembly 48 for accomodating the rack or "tree" 50 on which the foodstuffs 52 are mounted. The rack 50 includes rollers 51 to facilitate movement into and out of the processing chamber. The latter also includes a shower assembly 54, including a plurality of spray nozzles 56, and the shower assembly is connected by piping 58 to a source of fluid coolant such as water or liquid carbon dioxide. Located in the base portion of the processing chamber 22 is a closable drain 60 which is connected via a conventional trap (not shown) to a conduit extending externally of the apparatus of the subject invention.

The mounting of the slats 30 by means of the pins 32 and elongated slots 34 enables the slats 30 to be vertically movable so as to adjust the size of passageways 42. By this arrangement, the distribution of the air and/or smoke within the processing chamber 22 may be controlled, in order to aid in the uniform distribution of the flow within the smoking chamber.

Figure 3:
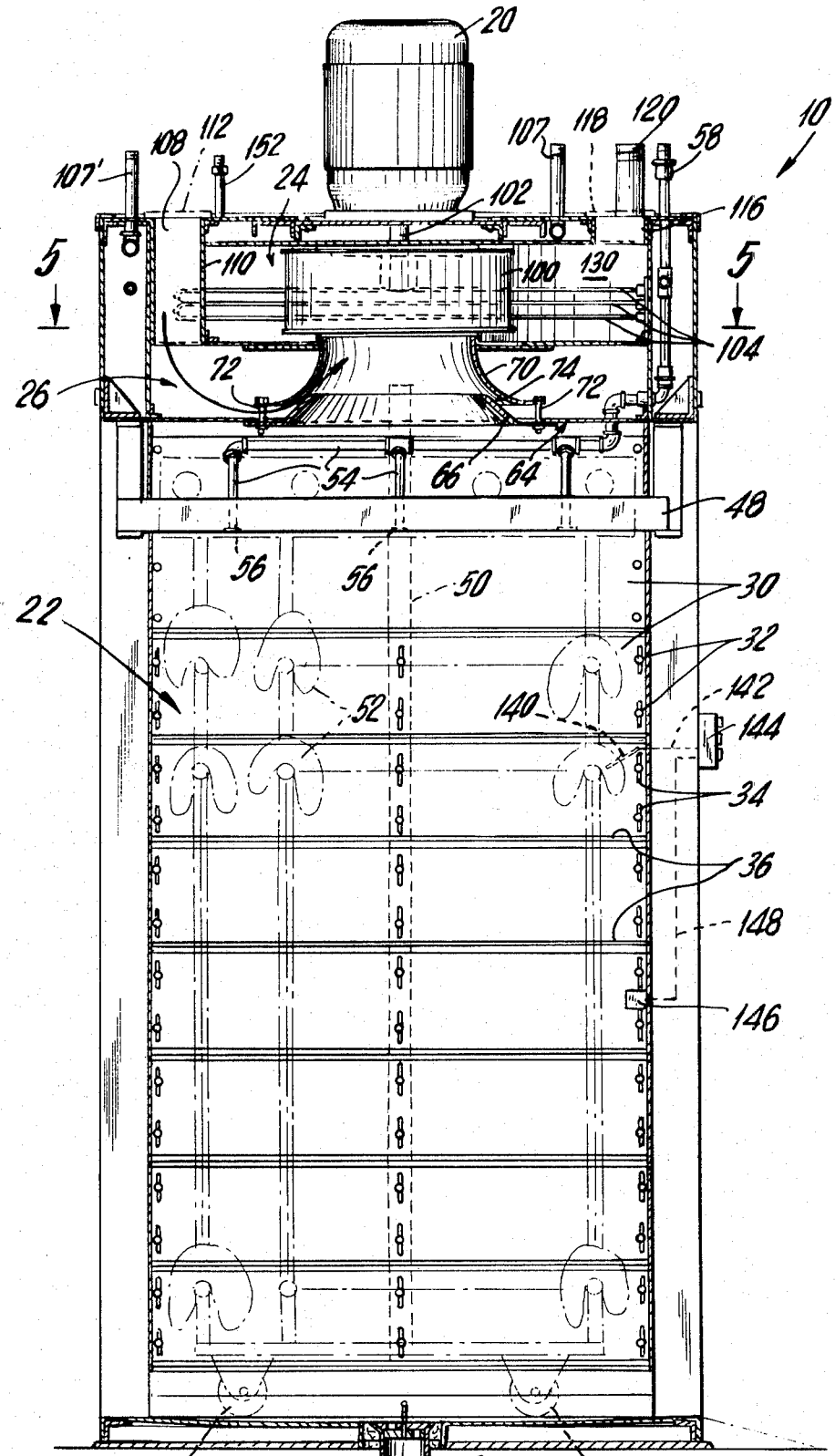
FIG. 3 is a sectional view taken along line 3—3 in FIG. 2.
Figure 4:
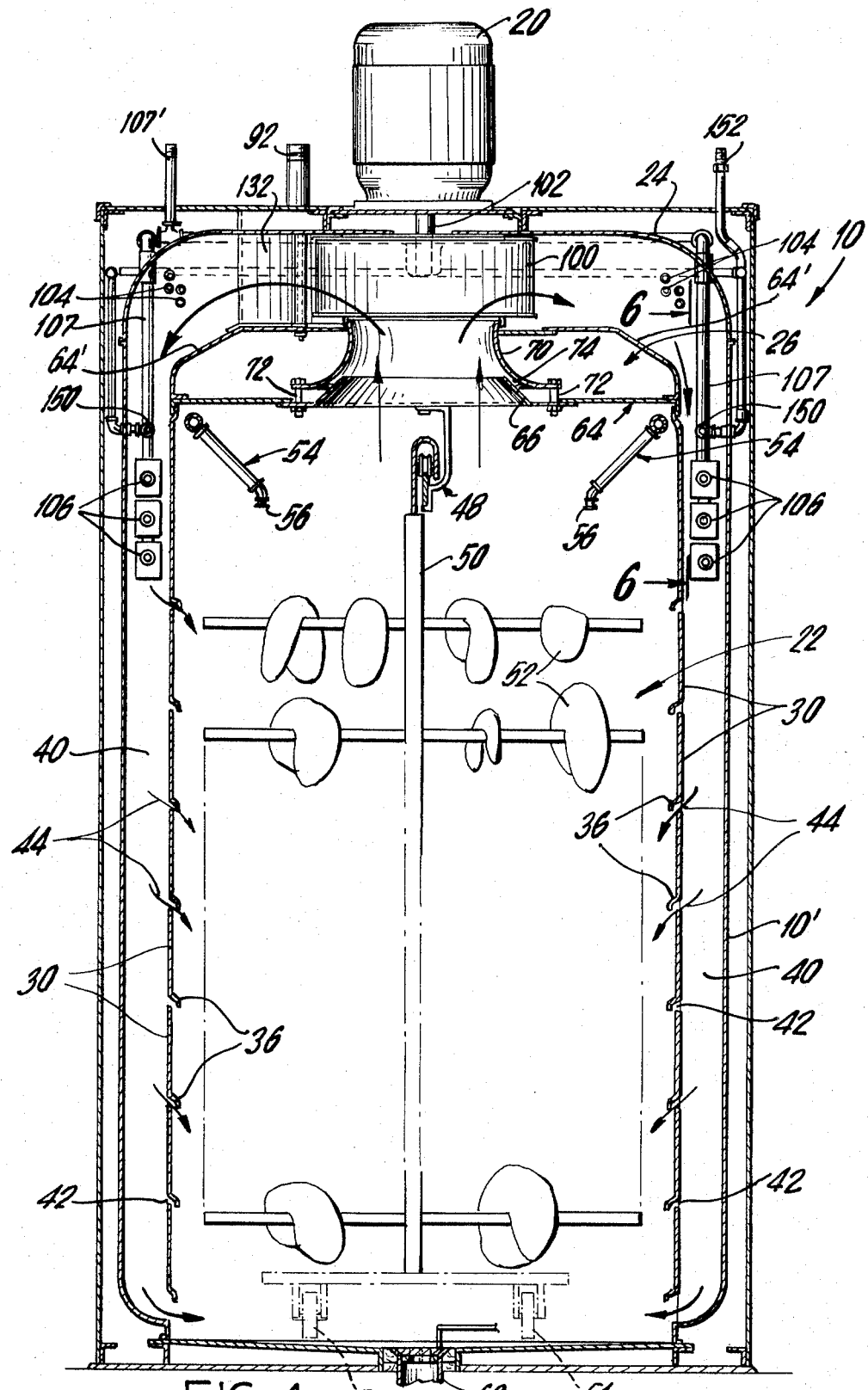
FIG. 4 is a sectional view taken along line 4—4 in FIG. 2.

As illustrated in FIGS. 3 and 4, the upper wall of the processing chamber is defined by a false ceiling 64 which also defines the plenum chamber 26. A central, annular opening is provided in the false ceiling 64, and an adjustable, hollow truncated cone 66 is secured to the false ceiling and extends partially into the plenum chamber 26. The false ceiling 64 includes a curved member 64' which cooperates with the upper curved wall of the distribution chamber to effectively taper the transition between the distribution chamber and the ducts 40. The curved member 64' also supports a volute 70 that is spaced from the adjustable truncated cone 64 so as to define an annular opening 74 enabling communication between the plenum chamber 26 and the interior of the volute 70. In turn, the upper portion of the volute 70 is open to the distribution chamber 24 immediately below a blower 100.

The volute 70 is secured to the curved member 64' of the false ceiling by bolts 72. Referring to FIG. 4, the annular opening 74 defined by the volute 70 and the truncated cone 64 is adjustable upon adjustment of the truncated cone 64.

Turning to FIGS. 5 and 7, mounted to the false ceiling 64 within the processing chamber 22 is a smoke chute 80 which comprises an elongated member 82 which is closed at one end 84, and having an open end in the vicinity of the adjustable truncated cone 66. The cross-section of the elongated member 82 is closed so as to form with the false ceiling 64 an elongated passageway, and slidably mounted within said member 82 is a similarly configured extension member 88 which, as illustrated by the arrow, may be moved so as to effectively extend the smoke chute 80 further toward the center of the truncated cone 66. An opening 90 is provided in the false ceiling 64 to which is connected the smoke inlet piping 92 which extends to a point externally of the housing 10 and is connected to a source of smoke (not shown). The smoke inlet piping is more clearly illustrated in FIGS. 3, 4 and 5. The smoke generating unit for providing smoke to the subject apparatus is preferably of the type disclosed in U. S. Letters Patent No. 3,462,282 which issued to G. Fessmann on Aug. 19, 1969 and is entitled "Process and Apparatus for Preparing a Smoking Fluid and Smoking Foodstuffs Therewith."

Referring to FIGS. 3 and 4, the distribution chamber 24 is defined by the upper curved wall of the housing 10 and upper portion 64' of the false ceiling, and side walls of the housing 10, and is connected by passageways leading to the side ducts 40,40. The blower 100 is disposed directly above the opening of the volute 70, and is connected by a shaft 102 to the two-speed motor 20. Also mounted within the distribution chamber are electrical heating means in the form of coils 104, and provided in the passageways extending from the distribution chamber 24 to each of the side ducts 40 is an arrangement of heating means in the form of steam pipes 106 (see FIG. 6). The plumbing 107 extending from the steam pipes projects from the top of the housing 10, and includes a condensate outlet 107'. The provision of two types of heating means is optional, and in most instances where high pressure steam is available, only the steam heating means 106 would be included in the apparatus. Of course, the primary reason for preferring steam is the lower operating cost of the unit. On the other hand, where only low pressure steam is available, the electrical heating 104 may be required, either singly or in combination with the low pressure steam heating means. To a great extent the type of heating means employed is a function of the heat required for cooking and/or smoking and specific goods to be processed.

Figure 2:
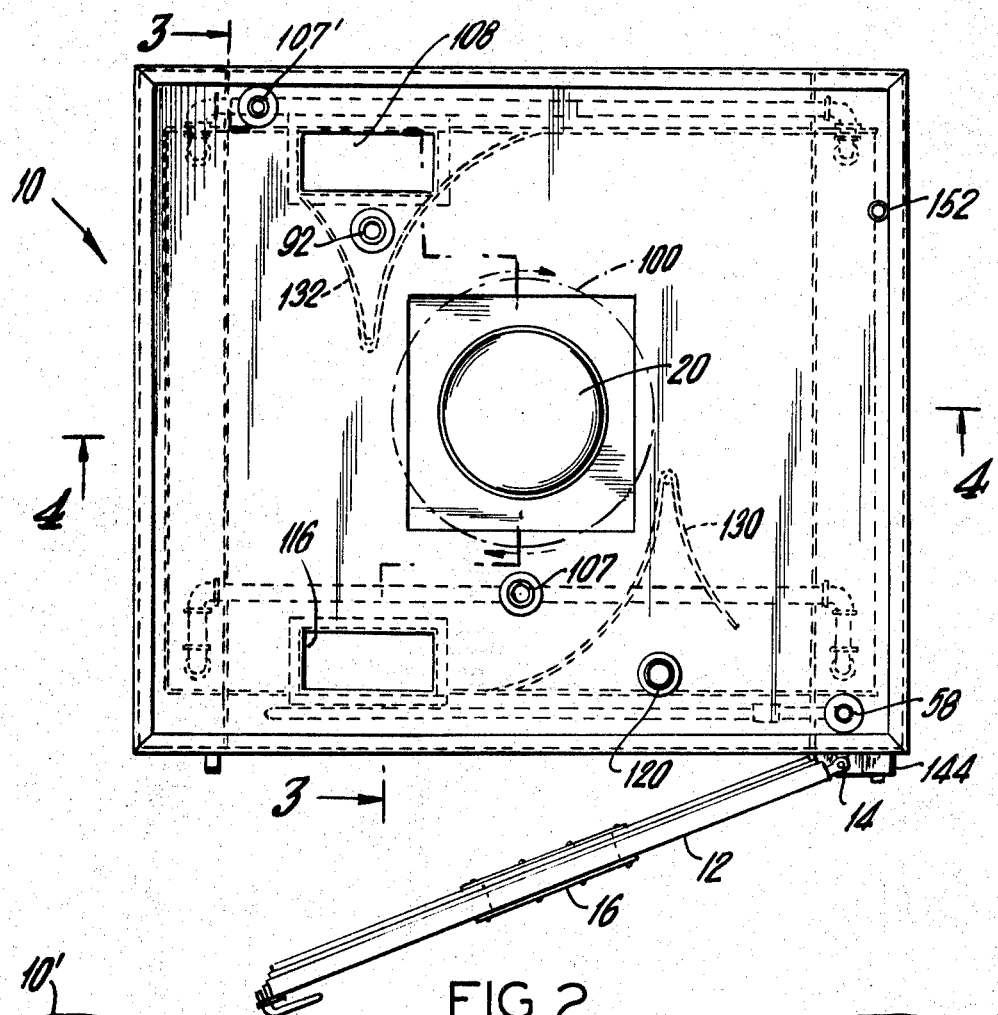
FIG. 2 is a top sectional view of the apparatus of the subject invention, with the door of the apparatus being partially open.

Referring to FIG. 2, a pair of rectangular shaped openings are provided in the upper wall of the housing 10. The first opening comprises a fresh air inlet 108 and is connected by a ducting 110 leading to the plenum chamber 26 (see FIG. 3). Inlet 108 is closed by a damper 112 which is controlled by a suitable actuating means (not shown). The second opening in the housing 10 comprises an exhaust duct 116 that is in communication with the distribution chamber 26. The exhaust opening 116 is also provided with a damper 118 that is controlled by a suitable actuating means (not shown). It is noted that the operation of the fresh air inlet 108 and the exhaust 116 are coordinated whereby the dampers of both openings are opened and closed simultaneously. Also extending through the upper wall of the housing 10 is a smoke vent bleed pipe 120 that is in communication with the upper distribution chamber 26.

Figure 6:
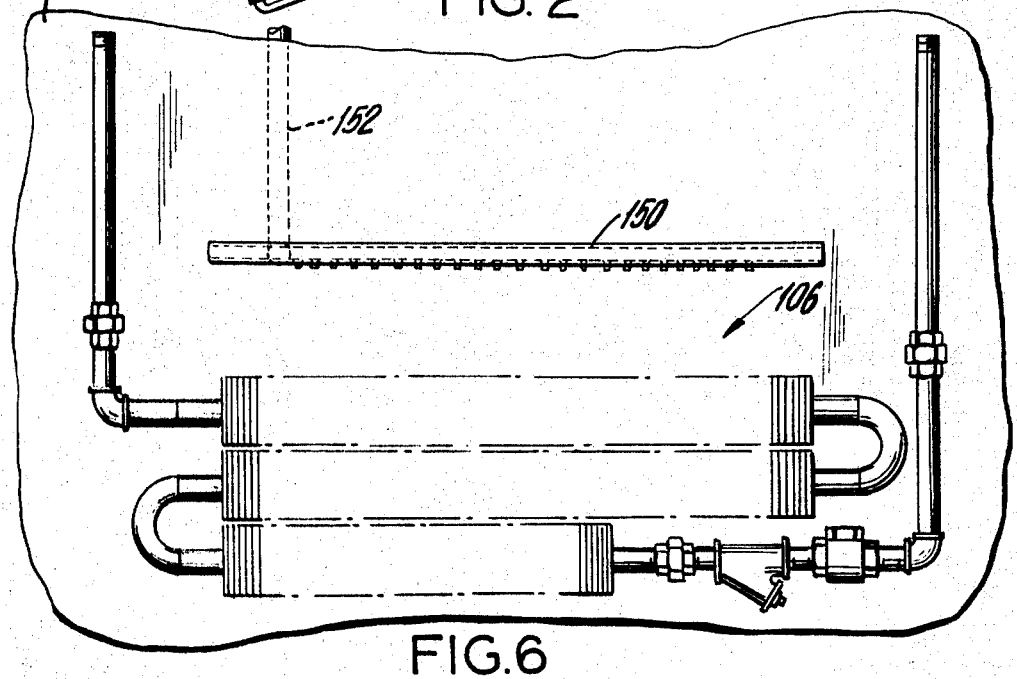
FIG. 6 is a partial sectional view taken along line 6—6 in FIG. 4.

Referring to FIGS. 4 and 6, a water spray unit 150 is provided in each side duct 40 above the steam pipes 106. Units 150 are connected to a source of water (not shown) through pipe 152 extending from the top of the housing. As is readily apparent, water sprayed from unit 150 contacts the heated steam pipes 106 thereby resulting in water vapor.

As illustrated in FIGS. 2 and 5, the upper distribution chamber includes a pair of guide vanes 130, 132, disposed on diametrically opposed sides of the blower 100. As indicated by the arrows in FIG. 2, the direction of rotation of the blower 100 is clockwise, and the guide vanes 130, 132 are suitably positioned in order to effectively direct the circulatory air flow from the blower 100 toward the passageways leading to the side ducts 40,40. In addition, as shown in FIG. 2, the fresh air inlet 108 is disposed within the contour of the V-shaped guide vane 132 so that the fresh air inlet is not in communication with the distribution chamber 24. On the other hand, the exhaust outlet 116 is positioned laterally of the guide vane 130 whereby the exhaust 116 is in communication with the distribution chamber 24. As previously indicated, motor 20 is a two-speed motor whereby the blower 100 may be operated at a low speed for the gentle circulation of flow within the housing 10 or alternatively, the blower 100 may be operated at high speed for the rapid circulation of flow within the housing. It is at the higher speed that the guide vanes 130, 132 are particularly effective in aiding the circulation of the flow from the distribution chamber to the side ducts 40,40.

In order to determine the internal temperature of the foodstuffs during the various phases of operation of the apparatus of the subject invention, a heat probe 140 is provided within the processing chamber 22 for insertion into a sample foodstuff 52, and is connected via a lead 142 to a control device 144, which is mounted externally of the housing 10. Because of the fact that the heat probe 140 is positioned within the foodstuff, it provides the optimum indication of the processing condition of the foodstuffs. Hence the output signals of the heat probe may be used fOr for cycling the subject apparatus to the next processing cycle. This is particularly advantageous when cycling from the "drying" cycle to the "smoking" cycle, and also from the "cooking" cycle to the "showering" cycle, as more fully described hereinafter.

While an automatic control system based on time alone may be adequate, the use of the control signal from heat probe 140 is preferable. For example, the change from the drying to the smoking cycle, if done on a straight timed basis, may differ considerably since the incoming temperature of the foodstuffs to be processed may vary considerably. Thus a timed interval for the drying cycle may be too little or too great but a change from drying to smoking initiated when the internal temperature of the product achieves the desired predetermined point much more accurately and precisely assures uniformity of processing. The same comment applies to the change from the cooking to the showering cycle.

In addition, a second temperature measuring device 146 is mounted within the processing chamber 22 to indicate the temperature of processing chamber 22, and is connected via lead 148 to control device 144. The control device 144 may form a portion of a control assembly for controlling each of the elements of the subject apparatus in order to enable the apparatus to operate through its various cycles automatically. Alternatively, the control device may be of the nature which would be observed by an operator who, through appripriate means, would cycle the apparatus through its various phases of operation.

The method of the subject invention will now be described with reference to apparatus 10. After the foodstuffs are mounted on a tree 50, the tree is rolled into the processing chamber 22, and the heat probe 140 is inserted into a sample foodstuff. After the door 12 of the housing is closed, the first cycle, consisting of the "drying cycle," of the apparatus is commenced. The objective of the drying cycle is to achieve the desired color of the product. A comminuted meat emulsion is generally gray in color, and in order to achieve the desired color, it is necessary to heat and dry the product simultaneously. One of the problems associated with this cycle is that if the cycle is carried on at too high a temperaure, the nitrates and nitrites in the comminuted meat emulsions may be affected so that the desired color is never achieved. On the other hand, if the relative humidity within the chamber is too high, it takes a longer time in order to achieve the desired color. The apparatus of the subject invention is able to satisfy both of these requirements by effecting a uniform circulation of air about the foodstuffs, while simultaneouly heating the processing chamber to slowly increase the temperature of the foodstuffs. Initially, the blower 100 is operated at high speed and the heating means 104 and 106 are actuated. Both dampers 112 and 118 are closed and hence the air within the housing is continually being heated and circulated, until the desired temperature (as measured by devices 140 and 146) are reached. In the next phase of the "drying" cycle operation, the air inlet duct 108 and the exhaust duct 116 are actuated to their open positions, and the blower 100 is still operated at high speed. The heating means, either in the form of electrical heating means 104 or the steam heating means 106 are still operative, to slowly increase the temperature within the apparatus so as to eventually raise the temperature of the foodstuffs to that required for developing the desired color. Operation of the blower 100 causes air to be drawn or sucked from the processing chamber 22 through the adjustable cone 66 to the volute 70 where it is mixed with fresh air that has entered the plenum chamber 26 through the inlet opening 108 and passed through the annular opening 74 between the cone 66 and volute 70. As is readily apparent, adjustment of the annular opening 74 by relative movement between the volute 70 and cone 66 will affect the amount of intermixing of fresh air and the air withdrawn from the processing chamber 22. As shown by the arrows in FIG. 4, the air passing from the volute 70 to the blower 100 is reversed in direction so as to flow laterally toward the side ducts 40. Of course, with the exhaust duct 116 open, a portion of this flow is also expelled to the atmosphere surrounding the housing 10. The air flowing over the upper portion 64' of the false ceiling passes the heating means and is then passed down both sidewalls to the ducts 40. Since the sources of heat for this circulated air is above any of the passageways 42 leading to the processing chamber, the temperature of the air passing through each of the passageways 42 is the same. As previously mentioned, it is desirable that a high percentage of the flow be directed to the processing chamber through the lowermost passageway 42 so as to achieve greater uniform flow within the chamber. As is apparent, the specific design of the cone 66 greatly enhances the distribution of the circulatory flow within the processing chamber. The angled walls of the adjustable cone 66 creates a Coanda effect whereby no "dead spots" are created throughout the cross-section of the processing chamber. Hence, all of the foodstuffs within the processing chamber are uniformly treated, as contrasted to the prior art wherein a central draft column was created upon operation of the blower system.

It should also be noted that the adjustment of the annular opening 74 by movement of the cone relative to the volute controls the number of changes of air per unit of time within the housing, and not the velocity in the housing. The velocity of the flow in the housing is controlled by the speed of operation of the blower 100, wheras the amount of additional air flow provided to the housing though the annular opening 74 affects the rate at which the mass flow within the housing may be circulated by the blower. The "drying" cycle is continued until the temperatures recorded by devices 140 and 146 have reached the desired levels, and the desired color of the foodstuffs has been reached. The introduction of fresh air to the circulatory flow within the housing 10 greatly aids in facilitating the rapid reduction in the amount of humidity of the air within the housing 10, and more particularly within the processing chamber 22, so as to achieve the desired humidity which enables the foodstuffs to reach the required temperature for obtaining the desired color.

The next cycle of the subject process is the smoking cycle. During this cycle, the dampers 112 and 118 are simultaneous'y closed, thereby confining the circulation within the apparatus 10. The smoking cycle is normally continued for a pre-determined period of time, usually on the order of about 2 to 30 minutes depending on the product being processed. The motor 20 is switched to its low speed, and smoke is input to the apparatus through the feed pipe 92. As previously described, the smoke is conducted through the feed pipe 92 to the smoke chute 80, and conducted along the length of the elongated member 82 for discharge in the vicinity of the adjustable cone 66. As the blower 100 rotates at low speed, it draws air from the processing chamber 22, along with withdrawing air from the smoke chute 80, and the smoke and air are effectively mixed within the vicinity of the volute 70, and the mixture is directed past the blower to the distribution chamber 24 for subsequent recirculation through the side ducts 40. From the side ducts, the air is distributed to the processing chamber through the passageways 42 where the smoke contacts the foodstuffs. The smoke bleed pipe 120 is opened to continually bleed off a certain amount of smoke, and as previously mentioned, the fresh air damper 112 is closed, whereby no flow is provided from the plenum chamber 26. During the smoking cycle, the slowly recirculating smoke is continually being heated by means of the heating means 104 or 106 whereby the foodstuffs are being simultaneously cooked and smoked.

Figure 8:
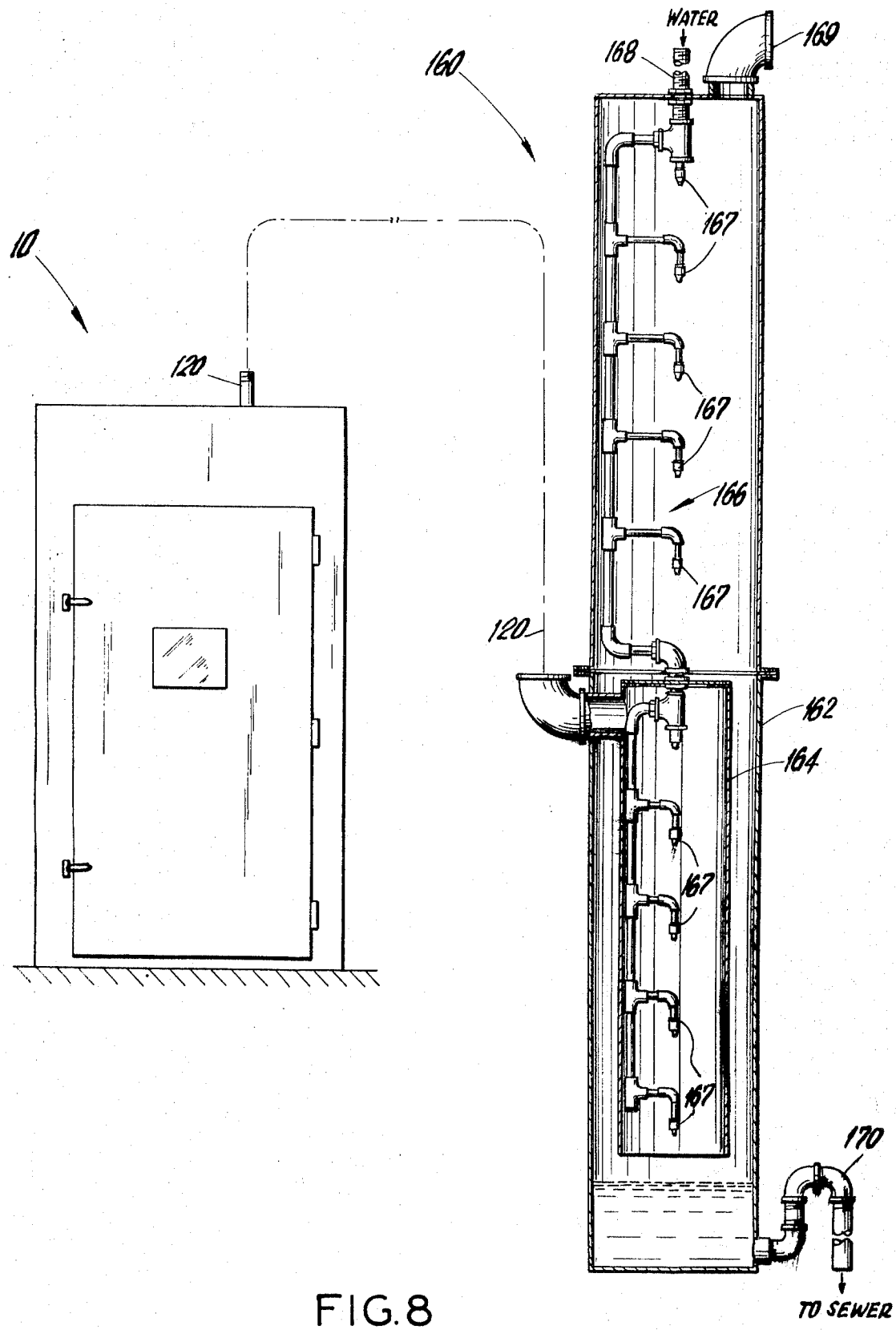
FIG. 8 is a partial sectional view of a condenser assembly for use with the subject apparatus.

During the smoking cycle, the smoke which is bled through bleed pipe 120 is passed to a condenser assembly for treatment prior to exhausting. This processing is required to satisfy the various governmental pollution laws. The condenser is illustrated in FIG. 8 and is designated by numeral 160. The condenser is connected to bleed pipe 120 and is located externally of the housing 10, with its exhaust end connected to a drain pipe 170 leading to the sewer system. Condenser 160 includes two concentric cylinders 162 and 164, with a shower assembly 166 being disposed within the condenser and supplied with water via piping 168. The opposite ends of the condenser are closed and a vent pipe 169 is provided at the upper end of the condenser. Water pumped through the shower assembly 166 exists via nozzles 167 and hydraulically scrubs the smoke emtering the condenser through pipe 120. The condensed smoke then exits via drain 170. It is noted that smoke bleeds from the processing chamber to the condenser because of the greater pressure developed in the processing chamber.

It is noted that even at the low speed of operation of the blower assembly, the provision of the false ceiling including the cone 66 ensures that the air and/or smoke being withdrawn from the processing chamber rises in a substantially broad column, whereby all of the foodstuffs are uniformly exposed to the air and/or smoke. The provision of the false ceiling structure within the houisng 10 is of extreme importance in greatly reducing the amount of time required for processing the foodstuffs, thereby cutting the cost of processing while simultaneously providing greater control of the amount of shrinkage of the product. It is also noted that the provision of the volute 70 located above the cone 66 provides an effective means for ensuring that any condensate which occurs within the region of the plenum chamber 26 condenses on the surface of the volute and runs downwardly along the curved inner surface of the volute to a point beyond the upper opening of the truncated cone 66, whereby the condensate collects within the plenum chamber 26. As is readily apparent, in prior art devices where merely a hole was provided in the partition between the smoking chamber and the upper chamber, any condensate would have a tendency to collect on the walls of the partition and eventually drop onto the foodstuffs, thereby creating spotting of the foodstuffs. As is readily apparent, this is extremely detrimental to the esthetic and taste qualities of the foodstuffs.

Following the designated period of the smoke cycle, the smoke intake is closed. Assuming that the foodstuffs have not reached the required temperature to complete cooking thereof, the next step in the subject process is the cooking cycle. The amount of time in which the foodstuffs are cooked beyond the smoking cycle is, of course, a function of the specific type of foodstuffs and the temperature required in order to insure that the foodstuffs have been sufficiently cooked to kill off or inhibit the bacterial growth to insure proper aging qualities of the foodstuffs. During the cook cycle, one objective is to remove the smoke from the circulating flow, and hence the spray unit 150 in each side duct 40 is turned on so as to cause water to be sprayed on the heating coil 106 thereby creating steam. The latter has two beneficial effects: (1) it rinses and scrubs down the smoke in the circulating flow, and the condensed water, including the smoke, collects at the base of the processing chamber and exits through the drain 60 which is opened to allow liquid to drain; and (2) it adds steam to the circulating air which substantially aids in cooking the foodstuffs. It is noted that during the cook cycle, steam is also exhausted via the bleed pipe 120 and thence through the condenser 160 to drain.

After the completion of the smoking cycle and the cooking cycle, the foodstuffs have been completely processed. If desired, an additional cycle in the form of a spraying cycle may be included in the processing. To this end, the blower is turned off, and water or liquid coolant such as carbon dioxide is sprayed through the shower assembly 54 and the spray nozzles 56 directly down onto the foodstuffs 52 and allowed to drain through the drain 60 which is opened. The showering of the foodstuffs is effective to bring the foodstuffs down to a temperature which will allow the foodstuffs to be immediately moved into a cooler. If the very hot foodstuff products are moved directly into a cooler without sufficient cooling, the product may split open and/or may explode. There is always the danger of this, for example in comminuted meat emulsions such as frankfurters or bologna, that the sudden change in temperature will cause a crack or split in the casing. Hence, it is preferable to shower the products from their very high cooking temperature to a point fairly close to room temperature, say about 70°-90° F. During the showering process, the reduction in temperature of the foodstuffs is readily measured by means of the probe 140. Following the completion of the shower cycle, the foodstuffs are removed from the housing and placed in a suitable storage facility.

Accordingly, the present invention provides a new and improved method and apparatus for treating foodstuffs. The apparatus of the subject invention is effective in providing uniform treatment of foodstuffs mounted on a tree, and is specifically characterized by the intermediate false ceiling which greatly aids in ensuring a uniform distribution of air and/or smoke within the processing chamber, and is extremely effective during the drying cycle of operation to rapidly condition the foodstuffs to the desired temperature and humidity conditions for the various cycles of processing.

An electrical system for enabling the subject apparatus to be operated in an automatic manner will now be described. Basically, the control circuit for the electrical system includes a drying cycle relay, a smoke cycle relay having a timing means, a cook cycle relay, a shower cycle latching relay, and a time/temperature control relay. The latter is interconnected to the temperature probes 140 and 146. In addition, suitable heat control relays including high and low set points are required. For controlling the actuation of the dampers 112, 116, a vent timer would be required, as well as a smoke/rinse timer for controlling the solenoid valve of the auxiliary shower means 150. As previously mentioned, motor 20 is a two-speed motor, and accordingly has a low speed motor contractor (switch) and a high speed motor contractor (switch). Timers would also be provided for the drying cycle relay, the smoke cycle relay, the cook cycle relay, and the shower cycle relay. Other devices which may be required will be described with reference to the following description. As soon as power is turned on, the various temperature probes 140, 146 are energized. When the start button is pushed, the drying cycle relay and a heat control relay are actuated. The drying cycle relay energizes the high speed contraction of the blower 100 which in turn energizes the vent timer. The heat control relay energizes the varies heat control circuits for the house. At this time, heat is introduced to the apparatus 10 and upon reaching a pre-determined temperature, the drying cycle timer will be activated. When the drying cycle timer times out, it opens the circuit to the drying cycle relay which disengages the blower high speed contractor. The drying cycle relay also de-energizes the vent timer, and simultaneously activates the smoke cycle timer which activates the activator for closing dampers 112, 116, and also the relay for the smoke cycle. The latter relay activates the blower low speed contractor which preferably includes its own timer mechanism in order to allow the blower motor to slow down prior to going into low speed. The smoke cycle relay also actuates a solenoid valve associated with the condenser 160. In addition, the smoke cycle relay actuates the heat control devices to reset the pre-set temperature from a low set point to a high set point. Furthermore, the smoke cycle relay also activates the circuit to the smoke generator. When the smoke timer times out, it disengages the smoke cycle relay and closes the circuit to the cook timer. The cook timer energizes the cook cycle relay which actuates the blower high speed contractor. The cook cyle relay energizes the solenoid valve for the auxiliary shower means 150 whereby water is sprayed from the auxiliary shower means onto the heating means 106 to produce steam for rinsing and scrubbing the smoke within the apparatus 10. At this time the apparatus is operating through its cook cycle. When the cook timer times out, it disengages the cook cycle relay and energizes the shower timer. The latter energizes the shower cycle latching relay which latches in and simultaneously disconnects the entire house heating circuit. At this time the foodstuffs are being rapidly cooled to a suitable temperature for removal from the processing chamber. When the shower timer times out, it unlatches the shower cycle latching relay and also the start/stop latching relay. The system described above basically relies on timing mechanisms, however, as is readily apparent, the sequence of operation may be controlled based on an internal temperature program. The sequence of this program is the same as that for the time program except that the internal product temperature controller or probe 140 operates in conjunction with suitable latching relays to perform the duties of the dry cyle timer in the time program. A high set point on the internal product heat probe 140 performs the functions of the cook timer. When operating under an internal temperature program, the drying cycle and cook cycle timers are set to zero. whereas the smoke timer and the shower timer are used in the same manner as in the time program. Accordingly, the output of the heat probe 140 (disposed within a sample foodstuff) automatically controls the cycling of the apparatus from the "drying" cycle to the "smoke" cycle, and subsequently from the "cook" cycle to the "shower" cycle. This is particularly advantageous from the standpoints of achieving optimum processing of the foodstuffs and optimum efficiency of the apparatus.

Although the invention has been described with reference to preferred embodiments, numerous modifications and variations, both in form and in detail might occur to those skilled in the art. For example, several units 10 may be interconnected whereby the various cycles of operation would be coordinated in a manner whereby a single smoke generating unit may be interconnected to all of the housings, and the products would be at different stages of processing in various housings. By this arrangement, a single source of smoke, a single source of heat, and a single source of water could be used in conjunction with several apparatuses in tandem. Also, the interior of the processing chamber may be suitably modified such that, in lieu of a tree 50, the foodstuffs 52 may be placed on the racks of a conventional smokehouse cage. Use of a "cage" will not compromise the ability of the subject apparatus to uniformly process all of the foodstuffs within the processing chamber. With respect to the subject method, it is apparent that for certain foodstuffs the smoking cycle may be omitted, as well as the final showering cycle, without affecting the ability of the subject method to uniformly process a large quantity of foodstuffs in a single operation. Accordingly, all such modifications and variations are intended to be included in the scope and spirit of the appended claims.

What is claimed is:

1. Apparatus for processing foodstuffs comprising:
   a housing having an intermediate false ceiling dividing the housing into an upper distribution chamber and a lower processing chamber, said false ceiling defining a plenum chamber in communication with an air inlet in the wall of the housing, said false ceiling also including openings providing communication between said processing chamber, distribution chamber and plenum chamber;
   ducting means extending along opposite walls of said processing chamber in communication therewith and with said distribution chamber;
   an outlet in aid housing in communication with said distribution chamber;
   means for supplying smoke to said processing chamber in the region of said openings;
   heating means disposed in the distribution chamber;
   a blower disposed in said distribution chamber; and
   means for driving said blower to circulate air and/or smoke from the plenum chamber and the processing chamber through the distribution chamber to either the outlet or via the ducting means to the processing chamber.

2. Apparatus for processing foodstuffs as in claim 1 wherein the opening interconnecting the plenum chamber and the processing chamber is defined by a hollow, truncated cone supported by said false ceiling, and the opening between said plenum chamber and said distribution chamber is defiend by a volute, the volute and cone being spaced to control the circulation of air within the apparatus.

3. Apparatus for processing foodstuffs as in claim 2 wherein the truncated cone is adjustable to vary the spacing between the volute and the cone.

4. Apparatus for processing foodstuffs as in claim 1 wherein the ducting means provided on opposite walls of the processing chamber include a plurality of slots to aid in uniformly distributing the circulation within the processing chamber.

5. Apparatus for processing foodstuffs as in claim 1 wherein the means for supplying smoke comprises an intake pipe extending from a point externally of the housing through the distribution chamber and plenum chamber to a smoke chute attached to the lower portion of the false ceiling, said smoke chute having an outlet in the region of the opening between the plenum chamber and the processing chamber.

6. Apparatus for processing foodstuffs as in claim 5 wherein the length of the smoke chute is variable.

7. Apparatus for processing foodstuffs as in claim 1 wherein both the air inlet and the outlet include dampers that are mechanically operated in a manner that both dampers are simultaneously opened and simultaneously closed.

8. Apparatus for processing foodstuffs as in claim 1 wherein guide vanes are provided in the distribution chamber to aid in directing the circulatory flow.

9. Apparatus for processing foodstuffs as in claim 1 wherein the means for driving the blower comprises a two-speed motor mounted externally of the housing and connected to said blower.

10. Apparatus for processing foodstuffs as in claim 1 further including a shower unit disposed in the processing chamber.

11. Apparatus for processing foodstuffs as in claim 10 further including a drain provided in the base of the processing chamber.

12. Apparatus for processing foodstuffs as in claim 1 further including auxiliary heating means disposed in the ducting means extending along opposite walls of the processing chamber.

13. Apparatus for processing foodstuffs as in claim 12 further including auxiliary shower means provided in the ducting means extending along the opposite walls of the processing chamber, and above the auxiliary heating means whereby water sprayed from said auxiliary shower means impinges on the auxiliary heating means to create steam within the ducting means.

14. Apparatus for processing foodstuffs as in claim 1 further including a first temperature probe means provided in the processing chamber, and a second temperature probe means capable of being inserted into the foodstuffs to be processed, in order to determine the temperatures of the foodstuffs and the temperature of the air within the processing chamber during the various stages of operation of the apparatus.

15. Apparatus for processing foodstuffs comprising:
   an insulated enclosure;
   a false ceiling mounted in said enclosure and dividing the enclosure into an upper distribution chamber and a lower processing chamber, with the false ceiling defining a plenum chamber connected via ducting to an air inlet in the wall of the enclosure, said false ceiling having openings therein providing communication between said processing chamber, said distribution chamber, and said plenum chamber;

a hollow truncated cone supported by said false ceiling and provided in the opening between the plenum chamber and the processing chamber;

a volute supported by said false ceiling and provided in the opening between the plenum chamber and the distribution chamber, said volute and truncated cone being spaced to define the opening leading from the plenum chamber;

ducting means extending along opposite walls of siad processing chamber in communication therewith and with said distribution chamber;

said enclosure including an outlet in communication with said distribution chamber;

means for supplying smoke to said processing chamber in the region of said hollow truncated cone;

heating means disposed in the distribution chamber;

a blower disposed in said distribution chamber; and means for driving said blower to circulate air and/or smoke from the processing chamber and air from the plenum chamber through the distribution chamber to either the outlet or via the ducting means to the processing chamber.

16. Apparatus for processing foodstuffs as in claim 15 wherein the ducting means provided on opposite walls of said processing chamber include a plurality of passageways to uniformly distribute the circulation within the processing chamber.

17. Apparatus for processing foodstuffs as in claim 15 wherein the means for supplying smoke comprises an intake pipe extending from a point externally of the enclosure through the distribution chamber and plenum chamber to a smoke chute attached to the lower portion of the false ceiling, said smoke chute having an outlet in the region of said hollow truncated cone.

18. Apparatus for processing foodstuffs as in claim 15 wherein the length of the smoke chute is variable.

19. Apparatus for processing foodstuffs as in claim 15 wherein both the air inlet and the outlet include dampers that are mechanically operated in a manner that both dampers are simultaneously opened and simultaneously closed.

20. Apparatus for processing foodstuffs as in claim 15 wherein guide vanes are provided in the distribution chamber to aid in directing the circulatory flow.

21. Apparatus for processing foodstuffs as in claim 15 wherein the means for driving the blower comprises a two-speed motor mounted externally of the enclosure and connected to said blower.

22. Apparatus for processing foodstuffs as in claim 15 further including a shower unit disposed in the processing chamber.

23. Apparatus for processing foodstuffs as in claim 15 further including a drain provided in the base of the processing chamber.

24. Apparatus for processing foodstuffs as in claim 15 further including an auxiliary heating means disposed in the ducting means extending along opposite walls of the processing chamber.

25. Apparatus for processing foodstuffs as in claim 24 further including auxiliary shower means disposed in the ducting means and mounted above said auxiliary heating means.

26. Apparatus for processing foodstuffs as in claim 15 further including a temperature probe means provided in the processing chamber, which temperature probe means is inserted into a foodstuff to be smoked in order to determine the temperature thereof during the various stages of operation of the apparatus.

27. Apparatus for processing foodstuffs comprising:

a housing having an intermediate false ceiling dividing the housing into an upper distribution chamber and a lower processing chamber, said false ceiling defining a plenum connected via ducting to an air inlet in the wall of the housing, said false ceiling also including openings providing communication between said processing chamber, said distribution chamber and said plenum chamber;

a hollow, truncated cone supported by said false ceiling in the opening provided between said processing chamber and said plenum chamber;

a volute secured to said false ceiling in the opening between said plenum chamber and said distribution chamber, said volute and cone being spaced to control the size of the passageway extending between said plenum chamber and said volute;

ducting means extending along opposite walls of said processing chamber in communication therewith and with said distribution chamber;

said housing including an outlet in communication with said distribution chamber;

means for supplying smoke to said apparatus including an intake pipe extending from a point externally of the housing through the distribution chamber and the plenum chamber to a smoke chute attached to the lower portion of said false ceiling, said smoke chute having an outlet in the region of the hollow, truncated cone;

heating means disposed in the ducting means extending along opposite walls of the processing chamber;

shower means disposed in the ducting means extending along opposite walls of the processing chamber above said heating means;

a blower disposed in said distribution chamber; and a two-speed motor mounted on said housing for driving said blower to withdraw air and/or smoke from the plenum chamber and the processing chamber to the distribution chamber and to either recirculate same via the ducting means to the processing chamber, or to expel same through said outlet.

28. Apparatus for processing foodstuffs as in claim 27, wherein the size of the truncated cone is adjustable whereby the spacing between the volute and the cone may be varied.

29. Apparatus for processing foodstuffs as in claim 28, wherein the length of the smoke chute is variable.

30. Apparatus for processing foodstuffs as in claim 28 wherein both the air inlet and the outlet include dampers that are mechanically operated in a manner that both dampers are simultaneously opened and simultaneously closed.

31. Apparatus for processing foodstuffs as in claim 28 wherein guide vanes are provided in the distribution chamber to aid in directing the circulatory flow.

32. Apparatus for porcessing foodstuffs as in claim 28 further including a shower assembly disposed in the processing chamber.

33. Apparatus for processing foodstuffs as in claim 32 further including a drain provided in the base of the processing chamber.

34. Apparatus for processing foodstuffs as in claim 28 further including a temperature probe means provided in the processing chamber, which temperature probe means is inserted into the foodstuffs to be smoked in order to determine the temperature thereof during the various stages of operation of the apparatus.

35. Apparatus for processing foodstuffs as in claim 34 further including a temperture measuring means located in the processing chamber for measuring the temperature thereof during the various stages of operation of the apparatus.

* * * * *